United States Patent
Saiki et al.

(10) Patent No.: US 12,173,164 B2
(45) Date of Patent: Dec. 24, 2024

(54) METHOD FOR PRODUCING COMPOSITE MATERIAL

(71) Applicant: ADEKA CORPORATION, Tokyo (JP)

(72) Inventors: Tomoaki Saiki, Tokyo (JP); Ryo Taniuchi, Tokyo (JP); Yuta Nohara, Tokyo (JP); Hikaru Tateishi, Tokyo (JP); Hideyuki Yokota, Tokyo (JP); Toru Yano, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 761 days.

(21) Appl. No.: 17/260,471

(22) PCT Filed: Jul. 29, 2019

(86) PCT No.: PCT/JP2019/029632
§ 371 (c)(1),
(2) Date: Jan. 14, 2021

(87) PCT Pub. No.: WO2020/027041
PCT Pub. Date: Feb. 6, 2020

(65) Prior Publication Data
US 2021/0269650 A1    Sep. 2, 2021

(30) Foreign Application Priority Data

Jul. 30, 2018   (JP) ................................ 2018-142984

(51) Int. Cl.
| | |
|---|---|
| *C09C 1/46* | (2006.01) |
| *C08K 3/04* | (2006.01) |
| *C09C 3/00* | (2006.01) |
| *C09C 3/04* | (2006.01) |
| *C09C 3/10* | (2006.01) |
| *C09D 123/00* | (2006.01) |
| *C09D 163/00* | (2006.01) |

(52) U.S. Cl.
CPC ............... *C09C 1/46* (2013.01); *C09C 3/006* (2013.01); *C09C 3/04* (2013.01); *C09C 3/10* (2013.01); *C09D 123/00* (2013.01); *C09D 163/00* (2013.01); *C01P 2004/62* (2013.01); *C01P 2006/12* (2013.01); *C08K 3/04* (2013.01); *C08K 2201/006* (2013.01)

(58) Field of Classification Search
CPC ................ C09C 1/46; C09C 3/04; C09C 3/10
See application file for complete search history.

(56) References Cited

U.S. PATENT DOCUMENTS

| | | | |
|---|---|---|---|
| 4,477,608 | A | 10/1984 | Bäbler et al. |
| 2012/0301707 | A1 | 11/2012 | Kinloch et al. |
| 2013/0296479 | A1 | 11/2013 | Martin et al. |
| 2014/0272350 | A1 | 9/2014 | Kim et al. |
| 2016/0101980 | A1 | 4/2016 | Hasegawa et al. |
| 2016/0200580 | A1 | 7/2016 | Liu et al. |
| 2017/0095784 | A1 | 4/2017 | Kobayashi et al. |
| 2017/0298261 | A1* | 10/2017 | Nozato ..................... C09K 5/14 |
| 2018/0044191 | A1 | 2/2018 | Song et al. |
| 2018/0186954 | A1 | 7/2018 | Zheng et al. |
| 2020/0216324 | A1 | 7/2020 | Song et al. |

FOREIGN PATENT DOCUMENTS

| | | |
|---|---|---|
| CN | 105800579 A | 7/2016 |
| CN | 107200947 A | 9/2017 |
| CN | 107381643 | 11/2017 |
| CN | 107406263 A | 11/2017 |
| JP | S59-56435 | 3/1984 |
| JP | S59-156903 | 9/1984 |
| JP | 2012-240891 | 12/2012 |
| JP | 2014009151 A * | 1/2014 |
| JP | 2016-60887 | 4/2016 |
| JP | 2016-110953 A | 6/2016 |
| JP | 2016-531824 A | 10/2016 |
| JP | 2017141345 A * | 8/2017 |
| JP | 2018-70412 | 5/2018 |
| JP | 2018-177549 | 11/2018 |
| TW | 201540709 A | 11/2015 |
| WO | 2016/088682 | 6/2016 |

OTHER PUBLICATIONS

JP2017141345, machine translation. (Year: 2017).*
JP2014009151, machine translation. (Year: 2017).*
Mu et al., "Thermal conductivity of 2D nano-structured graphitic materials and their composites with epoxy resins," 2D Materials, vol. 4, 2017, pp. 1-22.
International Search Report for PCT/JP2019/029632 dated Sep. 10, 2019, 5 pages.
Written Opinion of the ISA for PCT/JP2019/029632 dated Sep. 10, 2019, 6 pages.

* cited by examiner

*Primary Examiner* — Robert A Vetere
(74) *Attorney, Agent, or Firm* — NIXON & VANDERHYE

(57) ABSTRACT

Provided is a method for producing a composite material in which the dispersibility of an exfoliated layered substance in a resin or the like is improved and with which a synthetic resin having significantly improved properties, such as impact resistance, can be obtained. A method for producing a composite material including an exfoliated layered substance and a coating substance coating a surface of the exfoliated layered substance includes a disintegrating step of disintegrating secondary particles of an exfoliated layered substance in a solution containing a coating substance, or a method for producing a composite material including an exfoliated layered substance and a coating substance coating a surface of the exfoliated layered substance includes a disintegrating step of disintegrating secondary particles of an exfoliated layered substance in a solvent and a dissolving step of dissolving a coating substance in a dispersion containing the exfoliated layered substance that has been disintegrated.

13 Claims, No Drawings

METHOD FOR PRODUCING COMPOSITE MATERIAL

This application is the U.S. national phase of International Application No. PCT/JP2019/029632 filed Jul. 29, 2019 which designated the U.S. and claims priority to JP Patent Application No. 2018-142984 filed Jul. 30, 2018, the entire contents of each of which are hereby incorporated by reference.

TECHNICAL FIELD

The present invention relates to a method for producing a composite material in which the surface of an exfoliated layered substance such as exfoliated graphene is coated with a coating substance.

BACKGROUND ART

Exfoliated graphite such as graphene obtained by exfoliating graphite, which is a layered substance, is used as a conductive assistant for electrodes of secondary batteries (see Patent Literature 1, for example), a conductive ink (see Patent Literature 2, for example), a filler for resins and elastomers (see Patent Literatures 3 and 4, for example), a gas barrier material (see Patent Literatures 5 and 6, for example), or the like. Exfoliating a layered substance results in a reduction in the thickness of the layered substance. The smaller the number of layers is, the more likely the layered substance is to aggregate, and the lower the dispersibility in a matrix is. Due to this problem, there are cases where sufficient properties cannot be obtained. In order to improve the aggregation properties and the dispersibility in a solvent or the like, JP 2016-531824T (see Patent Literature 7) discloses a method for coating the surface of exfoliated graphite with a polymer such as polyvinyl alcohol, as well as a coated product of oxidized exfoliated graphite. Oxidized exfoliated graphite is a substance that has a hydroxy group or a carboxy group at an end portion or the like of the layered structure of exfoliated graphene, and is therefore easy to disperse in water or an organic solvent and easy to coat with a polymer. However, in the case of exfoliated graphene, which does not have such a functional group, the inside of secondary particles formed through aggregation of exfoliated graphene cannot be sufficiently coated with the method disclosed in JP 2016-531824T, and therefore, dispersibility of exfoliated graphene is insufficient when added to a resin or the like.

CITATION LIST

Patent Literature

Patent Literature 1: JP 2016-060887A
Patent Literature 2: US 2016101980 (A1)
Patent Literature 3: US 2012301707 (A1)
Patent Literature 4: US 2013296479 (A1)
Patent Literature 5: US 2014272350 (A1)
Patent Literature 6: US 2018186954 (A1)
Patent Literature 7: US 2016200580 (A1)

SUMMARY OF INVENTION

Problems to be Solved by the Invention

An object of the present invention is to provide a production method with which an exfoliated layered substance that has favorable dispersibility when added to a resin or the like and provides a great effect of improving the properties of the resin or the like can be obtained.

Means for Solving the Problems

The inventors of the present invention have conducted in-depth study regarding the above-described object and found that it is possible to achieve the above-described object by producing a composite material by dipping an exfoliated layered substance in a solution containing a coating substance and disintegrating secondary particles of the exfoliated layered substance, and the present invention was thus completed. The inventors of the present invention also found that it is possible to achieve the above-described object by dissolving a coating substance in a dispersion solution of an exfoliated layered substance in which secondary particles of the exfoliated layered substance have been disintegrated, and the present invention was thus completed.

That is to say, the present invention provides a method for producing a composite material including an exfoliated layered substance and a coating substance coating a surface of the exfoliated layered substance, the method including a disintegrating step 1 of disintegrating secondary particles of an exfoliated layered substance in a solution containing a coating substance. Also, the present invention provides a method for producing a composite material including an exfoliated layered substance and a coating substance coating a surface of the exfoliated layered substance, the method including a disintegrating step 2 of disintegrating secondary particles of an exfoliated layered substance in a solvent and a dissolving step of dissolving a coating substance in a dispersion containing the exfoliated layered substance that has been disintegrated.

Advantageous Effects of Invention

With the production method of the present invention, a composite material can be produced in which the dispersibility of the exfoliated layered substance in a resin or the like is improved and with which a resin having significantly improved properties, such as impact resistance, can be obtained.

DESCRIPTION OF EMBODIMENTS

First, a composite material that is to be produced using the production method of the present invention will be described. The composite material includes an exfoliated layered substance and a coating substance coating a surface of the exfoliated layered substance.

Exfoliated Layered Substance

The composite material contains an exfoliated layered substance.

A layered substance has a layered structure in which unit layers individually formed through strong bonding, such as covalent or ionic bonding, are stacked together mainly via weak van der Waals forces. Examples of the layered substance include graphites, boron nitrides, transition metal dichalcogenides, group 13 chalcogenides, group 14 chalcogenides, bismuth chalcogenides, layered metal halides, layered transition metal oxides, layered perovskite oxides, clay minerals and layered silicates. The layered substance is preferably a graphite or a boron nitride.

The graphites are layered compounds that have unit layers made of carbon. Examples of the graphites include graphite, expanded graphite in which the interlayer spacing of graphite is expanded, and graphite oxide obtained by oxidizing graphite using an oxidizing agent.

The boron nitrides are layered substances that contain nitrogen and boron as constituent elements. Examples of the boron nitrides include boron nitride (BN) and boron carbon nitride (BCN).

The transition metal dichalcogenides are layered substances made of a transition metal and a chalcogen, and are represented by the formula $MX_2$, wherein M represents a transition metal and X represents a chalcogen. Titanium, zirconium, hafnium, vanadium, niobium, chromium, molybdenum, tungsten, technetium, rhenium, nickel, tin, palladium, and platinum may be used as the transition metal. Sulfur, selenium, and tellurium may be used as the chalcogen. Specific examples of the transition metal dichalcogenides include $TiS_2$, $TiSe_2$, $TiTe_2$, $HfS_2$, $HfSe_2$, $HfTe_2$, $VTe_2$, $VSez$, $NbS_2$, $NbSe_2$, $NbTe_2$, $MoS_2$, $MoSe_2$, $MoTe_2$, $WS_2$, $WSe_2$, $WTe_2$, $TcS_2$, $ReSe_2$, $ReS_2$, $ReTe_2$, $TaS_2$, $TaSe_2$, $TaTe_2$, and $PtTe_2$.

The group 13 chalcogenides are layered substances made of gallium or indium, which are group 13 elements, and the above-described chalcogen. Specific examples of the group 13 chalcogenides include GaS, GaSe, GaTe, and InSe.

The group 14 chalcogenides are layered substances made of germanium, tin, or lead, which are group 14 elements, and the above-described chalcogen. Specific examples of the group 14 chalcogenides include GeS, $SnS_2$, $SnSe_2$, and PbO.

The bismuth chalcogenides are layered substances made of bismuth and the above-described chalcogen. Specific examples of the bismuth chalcogenides include $Bi_2Se_3$ and $Bi_2Te_3$.

The layered metal halides are layered substances made of a metal element and a halogen. Specific examples of the layered metal halides include $MgBr_2$, $CdCl_2$, $CdI_2$, $AgF_2$, $AsI_3$, and $AlCl_3$.

The layered transition metal oxides are layered substances made of an oxide or an oxyacid of a transition metal such as titanium, manganese, molybdenum, niobium, and vanadium. Specific examples of the layered transition metal oxides include $MoO_3$, $Mo_{18}O_{52}$, $V_2O_5$, $LiNbO_2$, $K_2Ti_2O_5$, $K_2Ti_4O_9$, and $KTiNbO_5$.

The layered metal phosphates are layered phosphates of titanium, zirconium, selenium, tin, zirconium, aluminum, and the like. Specific examples of the layered metal phosphates include $Ti(HPO_4)_2$, $Ce(HPO_4)_2$, $Zr(HPO_4)_2$, and $AlH_2P_3O_{10}$.

Examples of the layered perovskite oxides include $KCa_2Nb_3O_{10}$, $KSr_2Nb_3O_{10}$, and $KLaNb_2O_7$.

Examples of the clay minerals or the layered silicates include smectites such as montmorillonite, nontronite, and saponite; kaolin, pyrophyllite, talc, vermiculite, micas, brittle micas, chlorite, sepiolite, palygorskite, imogolite, allophane, hisingerite, magadiite, and kanemite.

In the present invention, the term "exfoliated layered substance" refers to a substance that is obtained by exfoliating a layered substance and has a layered structure having one unit layer to several thousand unit layers of the layered substance stacked together. The smaller the number of layers of the exfoliated layered substance is, and hence the smaller the thickness of the exfoliated layered substance is, the more likely the exfoliated layered substance is to aggregate, but the greater the property-improving effect provided by the exfoliated layered substance is. From the viewpoints of obtaining a better property-improving effect and achieving excellent economic efficiency, it is preferable that the average thickness of the exfoliated layered substance is 1,200 nm or less, more preferably 0.3 to 1,200 nm, even more preferably 1.5 to 400 nm, and most preferably 3 to 200 nm.

In the present invention, the thickness of the exfoliated layered substance means the thickness in a direction that is perpendicular to the layer-stacking plane of the exfoliated layered substance. The average thickness of the exfoliated layered substance means the average value of the thicknesses of thirty or more arbitrary pieces of the exfoliated layered substance. The thickness of the exfoliated layered substance can be measured by, for example, using an SEM image of the exfoliated layered substance that has been captured by a scanning electron microscope. Note that the thickness of the exfoliated layered substance is minimized when it consists of a single unit layer. The minimum thickness varies depending on the exfoliated layered substance, and is considered to be approximately 1 nm. For example, of exfoliated layered substances derived from graphite, an exfoliated layered substance consisting of a single unit layer is called graphene and theoretically has a thickness of about 0.335 nm.

From the viewpoint of obtaining a sufficient property-improving effect and also facilitating the exfoliation of the exfoliated layered substance, it is preferable that the average area of the exfoliated layered substance is 0.1 to 500 $\mu m^2$, more preferably 0.5 to 300 $\mu m^2$, and even more preferably 1.0 to 130 $\mu m^2$. In the present invention, the area of the exfoliated layered substance means the area of the exfoliated layered substance when seen in a plan view, and the average area means the average value of the areas of fifty or more arbitrary pieces of the exfoliated layered substance. The area of the exfoliated layered substance can be measured by, for example, using an image that is obtained by dropping a dilute dispersion of the exfoliated layered substance onto filter paper and imaging the exfoliated layered substance using a microscope.

Coating Substance

The composite material is obtained through coating with a coating substance. There is no particular limitation on the coating substance as long as it is an organic compound that can dissolve in a solvent and can form a stable coating film on the surface of the exfoliated layered substance. Examples of the coating substance include: macromolecular compounds, such as polyacrylate, polymethacrylate, polystyrene, polyacrylonitrile, polyacrylamide, polyvinyl compounds such as polyvinyl acetate, polyvinyl alcohol, polyvinyl acetal, polyvinyl butyral, ethylene-vinyl acetate copolymer, polyvinyl ether, polyvinylpyrrolidone, and polyvinylacetamide, olefin/maleic acid copolymer, olefin/fumaric acid copolymer, methyl cellulose, ethyl cellulose, acetyl cellulose, carboxymethyl cellulose, hydroxyethyl cellulose, hydroxypropyl cellulose, polyethylene glycol, polypropylene glycol, polytetramethylene glycol, and polysiloxane;

epoxy compounds, such as diglycidyl ethers of bisphenols, such as bisphenol A diglycidyl ether and bisphenol F diglycidyl ether, phenol novolac type epoxy resin, cresol novolac type epoxy resin, and 3,4-epoxycyclohexylmethyl-3,4-epoxycyclohexane carboxylate;

oxetane compounds, such as 3-ethyl-3-[(phenoxy)methyl]oxetane and 3,7-bis(3-oxetanyl)-5-oxa-nonane;

isocyanate compounds, such as 2,4-tolylene diisocyanate, 2,6-tolylene diisocyanate, diphenylmethane-4,4'-diisocyanate, isophorone diisocyanate, dicyclohexylmethane-4,4'-diisocyanate, and 1,6-hexamethylene diisocyanate;

acrylate compounds, such as methyl acrylate, ethyl acrylate, butyl acrylate, 2-ethylhexyl acrylate, hydroxyethyl acrylate, ethylene glycol diacrylate, and propylene glycol diacrylate;

methacrylate compounds, such as methyl methacrylate, ethyl methacrylate, butyl methacrylate, 2-ethylhexyl methacrylate, and dodecyl methacrylate;

vinyl ether compounds, such as butyl vinyl ether, cyclohexyl vinyl ether, and hydroxyethyl vinyl ether;

vinyl ester compounds, such as vinyl hexanoate, vinyl neodecanoate, and vinyl benzoate;

alkoxysilane compounds, such as methyltrimethoxysilane, butyltrimethoxysilane, and phenyltrimethoxysilane;

antioxidants, such as dibutylhydroxytoluene, butylated hydroxyanisole, stearyl(3,5-di-t-butyl-4-hydroxyphenyl) propionate, tridecyl phosphite, dilauryl thiodipropionate, ditridecyl thiodipropionate, phenyl naphthylamine, and 4,4'-bis(dialkyl)diphenylamine;

UV absorbers, such as benzotriazole-based UV absorbers, triazine-based UV absorbers, and cyanoacrylate-based UV absorbers;

hindered amine light stabilizers, such as 2,2,6,6-tetramethyl-4-piperidinol fatty acid ester;

flame retardants, such as tetrabromobisphenol A, tetrachlorophthalic anhydride, and tricresyl phosphate;

plasticizers, such as diheptyl phthalate, dioctyl phthalate, dioctyl adipate, diisodecyl adipate, dioctyl sebacate, trioctyl trimellitate, and tetraoctyl pyromellitate;

lubricants, such as fatty acid amide, ethylene bis fatty acid amide, metal soap, polyethylene wax, montan wax, and hardened castor oil;

surfactants, such as anionic surfactants, nonionic surfactants, cationic surfactants, and amphoteric surfactants;

hydrocarbons, such as paraffinic mineral oil, naphthenic mineral oil, aromatic mineral oil, polybutene, and poly-α-olefin; and ionic liquids, such as 1-butyl-3-methylimidazolium bis (trifluoromethanesulfonyl)imide and 1-butyl-3-methylimidazolium dicyanimide.

In the present invention, it is preferable that the coating substance is a macromolecular compound or an epoxy compound.

In the composite material of the present invention, the surface of the exfoliated layered substance is coated with a coating substance. In the present invention, the coating substance may coat at least a portion of the surface of the exfoliated layered substance, or the entire surface thereof, but it is preferable that the coating substance coats at least a larger fraction of the surface of the exfoliated layered substance. Furthermore, coating substance may coat the surface of the exfoliated layered substance continuously or discontinuously.

With regard to the amount of coating substance contained in the composite material, the amount of coating substance with respect to 100 parts by mass of the exfoliated layered substance is preferably 0.1 to 100 parts by mass, more preferably 0.2 to 70 parts by mass, even more preferably 0.5 to 60 parts by mass, and most preferably 1 to 50 parts by mass.

The production method of the present invention includes a disintegrating step 1 of disintegrating secondary particles of the exfoliated layered substance in a solution containing the coating substance (hereinafter, this method will be referred to as the "production method 1"). Alternatively, the production method of the present invention includes a disintegrating step 2 of disintegrating secondary particles of the exfoliated layered substance in a solvent and a dissolving step of dissolving the coating substance in a dispersion containing the exfoliated layered substance that has been disintegrated (hereinafter, this method will be referred to as the "production method 2 of the present invention"). The production method 1 includes a single step, or the disintegrating step 1. In contrast, the production method 2 includes two steps, or the disintegrating step 2 and the dissolving step. Therefore, the production method 2 is more complicated than the production method 1. However, when the solution containing the coating substance has high viscosity and it is thus difficult to perform the disintegration, or when the coating substance may be damaged by the disintegrating step 1, for example, when the coating substance is a macromolecular compound having a high molecular weight, the production method 2, which includes two steps, that is, the disintegrating step 2 and the dissolving step, may be advantageous rather than the production method 1 of the present invention.

In the present invention, the term "primary particle" means an object that is regarded as the smallest unit of particles when judged from its external geometrical form, and the term "secondary particle" means an assemblage of particles formed by a plurality of primary particles aggregating via physical forces (van der Waals forces). Moreover, the formation of secondary particles through aggregation of primary particles is referred to as "secondary aggregation". In the present invention, the term "disintegration" means an operation of causing secondary particles to break down into primary particles by exerting a mechanical force on the secondary particles, and there may be cases where a portion of the primary particles constituting the secondary particles is pulverized or has layers removed due to the disintegration, and the primary particles thus have a small particle size.

First, the production method 1 will be described. The solution containing the coating substance (hereinafter referred to as the "coating substance-containing solution") used in the disintegrating step 1 of the production method 1 is a solution in which the coating substance is dissolved in a solvent. The amount of coating substance contained in the solution containing the coating substance is not particularly limited, and can be set as appropriate such that the resulting composite material contains the coating substance in an amount within the above-described range.

A solvent having an excellent ability to dissolve the coating substance can be used without any particular limitation as the solvent used in the production method 1, and the solvent used in the production method 1 can be selected with consideration given to the ease of removal thereof through heating, pressure reduction, or the like, the viscosity or fluidity after the coating substance has been dissolved therein, the safety (toxicity, flammability, chargeability, etc.), and the like. Examples of solvents that can be favorably used in the production method 1 include alcoholic solvents, such as methanol, ethanol, isopropanol, ethylene glycol, propylene glycol, and methoxyethanol; ketonic solvents, such as acetone, methyl ethyl ketone methyl isobutyl ketone, and cyclohexanone; ester-based solvents, such as ethyl acetate and butyl acetate; heterocyclic solvents, such as pyridine, piperidine, morpholine, tetrahydrofuran, and dioxane; and dimethylformamide, N-methylpyrrolidone, and water.

In the disintegrating step 1 of the production method 1, secondary particles of the exfoliated layered substance are disintegrated in the coating substance-containing solution, and the exfoliated layered substance is coated with the coating substance. Since the exfoliated layered substance is likely to aggregate, in order to coat the exfoliated layered substance with the coating substance, the exfoliated layered substance cannot be sufficiently coated with the coating substance by merely dipping the exfoliated layered substance in the coating substance-containing solution, or stirring the coating substance-containing solution after dipping. For this reason, in the production method 1, while the secondary particles, which are formed through the aggregation of particles of the exfoliated layered substance, are disintegrated, the exfoliated layered substance is coated with the solution containing the coating substance. There is no particular limitation on the disintegration conditions such as the disintegration time, and the disintegration conditions can be set as appropriate, depending on the dispersion apparatus used for disintegration, such that the resulting composite material has an average thickness, an average area, and the like within the above-described ranges. The ratio of the coating substance-containing solution to the exfoliated layered substance varies depending on the dispersion apparatus used for disintegration, but it is preferable that the amount of coating substance-containing solution is about 200 to 5,000 parts by mass, with respect to 100 parts by mass of the exfoliated layered substance.

The disintegration of secondary particles of the exfoliated layered substance can be performed using a known method. However, it is preferable to disintegrate secondary particles of the exfoliated layered substance by exerting a strong external force on the secondary particles of the exfoliated layered substance. That is to say, in the production method 1, it is preferable to perform the disintegration using a dispersion apparatus capable of exerting an external force on the secondary particles. Examples of such a dispersion apparatus include a high-speed rotary shearing type stirring machine, a stirred media mill, a container-driven mill, a colloid mill, a high-pressure emulsifying machine, and an ultrasonic emulsifying machine. Note that, in the disintegrating step 1, since a large amount of external force is applied to the exfoliated layered substance, the exfoliated layered substance may be pulverized or have layers removed, and the average thickness or the average area of the exfoliated layered substance may thus become smaller than those prior to the treatment. The dispersion apparatuses will be described below.

High-Speed Rotary Shearing Type Stirring Machine

The high-speed rotary shearing type stirring machine is a dispersion apparatus of a type that includes a rotor and a stator that has an opening in a side surface thereof and draws up a slurry of the exfoliated layered substance from a lower portion of the machine by the rotor rotating at a high speed, and extrudes the slurry to an outer peripheral portion through the opening in the side surface of the stator. A large amount of shear force can be applied to the slurry when it passes through a gap between the rotor and the stator and when it is discharged through the opening in the side surface of the stator. The gap distance between the rotor and the stator is 0.1 to 0.3 mm, or preferably 0.15 to 0.2 mm. The rotation rate of the rotor is 2,000 to 15,000 rpm, or preferably 3,000 to 10,000 rpm. The high-speed rotary shearing type stirring machine may be called a high-speed homomixer, a high-shear mixer, or the like.

Container-Driven Mill

The container-driven mill is a dispersion machine that rotates or vibrates a container containing a slurry of the exfoliated layered substance and a grinding medium, and thereby disperses the exfoliated layered substance. A shear force is generated by the container and the grinding medium colliding with each other or the grinding medium particles colliding with each other. Examples of the container-driven mill include a container mill, in which the container rotates, a vibration mill, in which the container is vibrated, and a planetary mill, in which the container revolves while rotating. A grinding medium in the form of balls with a diameter of 0.2 mm or greater is typically used as the grinding medium. The container mill may be called a ball mill, as it employs a grinding medium in the form of balls.

Stirred Media Mill

In the stirred media mill, a slurry of the exfoliated layered substance and a grinding medium are stirred together, and a shear force is generated by the grinding medium particles colliding with each other. Beads having a diameter of about 0.03 to 10 mm are used as the grinding medium. Examples of the stirred media mill include a sand mill, an attritor, and a bead mill.

Colloid Mill

The colloid mill is a dispersion machine in which a slurry of the exfoliated layered substance is poured into a space between a high-speed rotating disk and a fixed disk that are arranged in close proximity to each other, and the exfoliated layered substance is thereby dispersed. A shear force is generated between the disks. Moreover, when a disk is used in which grooves are formed extending from the center toward the outer circumference as in a millstone, cavitation occurs, and the dispersibility can thereby be advantageously increased.

High-Pressure Emulsifying Machine

The high-pressure emulsifying machine is a dispersion machine that generates a sharp pressure drop and a turbulent flow by applying a pressure of at least 100 MPa to a slurry of the exfoliated layered substance to cause the slurry to pass through pores, to cause the slurry to pass through pores and then collide with a flat surface of a valve or the like, or a spherical surface of a ball or the like, or to cause liquids containing the raw material that have passed through pores to collide with each other, or by using other methods, and thereby generates a shear force and cavitation to perform the disintegration. The pore diameter of the pores is preferably 0.05 to 0.5 mm, and more preferably 0.1 to 0.3 mm. The speed at which the slurry passes through the pores is preferably 200 to 1,000 m/s, and more preferably 400 to 700 m/s.

Ultrasonic Emulsifying Machine

The ultrasonic emulsifying machine is a dispersion machine that applies ultrasonic waves to a slurry of the exfoliated layered substance and performs the disintegration by means of a shear force generated by the ultrasonic waves and cavitation caused by the formation of bubbles. The wavelength of the ultrasonic waves is 15 to 40 kHz, or preferably 15 kHz to 25 KHz.

A slurry containing a composite material including the exfoliated layered substance and the coating substance coating the surface of exfoliated layered substance is obtained by performing the disintegrating step 1 of the production method 1. In the production method 1, the solvent is preferably removed from the slurry containing the composite material. There is no particular limitation on the method for removing the solvent from the slurry, and, for example, a method such as heat drying, vacuum drying, spray drying, or freeze drying, or a combination of these methods can be used. The composite material that has been obtained using the production method 1 may be pulverized or granulated, if necessary.

Next, the production method 2 will be described. In the production method 2, first, secondary particles of the exfoliated layered substance are disintegrated in a solvent to prepare a slurry containing the exfoliated layered substance that has been disintegrated (hereinafter, this slurry will be referred to as the "slurry of the disintegrated exfoliated layered substance") (disintegrating step 2). The solvent used in the disintegrating step 1 can be used as the solvent used in the disintegrating step 2. With regard to the ratio of the solvent to the exfoliated layered substance, the amount of solvent is about 200 to 5,000 parts by mass, with respect to 100 parts by mass of the exfoliated layered substance. Moreover, the disintegration of secondary particles of the exfoliated layered substance can be performed in a similar manner to that in the disintegrating step 1 of the production method 1.

Then, the coating substance is dissolved in the slurry of the exfoliated layered substance. The coating substance, which may be dissolved in a solvent where necessary, is added to and dissolved in the slurry of the exfoliated layered substance (dissolving step). When dissolving the coating substance in the slurry, the dispersion machine used in the disintegrating step 2 may be used as-is, or a different apparatus may be used. After the addition of the coating substance to the slurry of the exfoliated layered substance, the exfoliated layered substance contained in the slurry is coated with the coating substance, and a slurry containing a composite material is thus obtained. The amount of coating substance dissolved in the slurry of the exfoliated layered substance is not particularly limited, and can be set as appropriate such that the resulting composite material contains the coating substance in an amount within the above-described range. In the production method 2, as is the case with the production method 1, it is preferable to remove the solvent from the slurry containing the composite material. The method for removing the solvent from the slurry is similar to that of the production method 1. The composite material that has been obtained using the production method 2 may be pulverized or granulated, if necessary.

In the composite material that has been obtained using the production method 1 or 2, the surface of the exfoliated layered substance is coated with the coating substance. Therefore, secondary aggregation of the exfoliated layered substance is prevented, and hence the dispersibility in a base material is significantly improved. Thus, the effect of the exfoliated layered substance of improving the properties of the base material can be achieved, or more specifically, for example, conductivity, heat dissipation properties, mechanical properties (impact resistance, flexural strength, compression strength, etc.), and other properties can be improved. The composite material can be favorably used in applications such as an additive for a resin, an elastomer, a paint, or the like; a conductive additive for a battery electrode; and the like.

EXAMPLES

Hereinafter, the present invention will be described in greater detail using examples and comparative examples. However, the present invention is not limited to the examples and the like given below. Unless otherwise stated, the terms "part" and "%" used in the examples mean "part by mass" and "% by mass", respectively.

Production Example 1

An exfoliated layered substance A1 was prepared from natural graphite in accordance with Example 1 of WO 2013/172350. Specifically, 74 parts by mass of 1-butyl-3-methylimidazolium hexafluorophosphate and 26 parts by mass of polyethylene glycol (product name: Polyethylene Glycol 20000, manufactured by FUJIFILM Wako Pure Chemical Corporation) were mixed, and dissolved through heating, and 10 parts by mass of natural graphite (manufactured by FUJIFILM Wako Pure Chemical Corporation) was dispersed in the solution. Then, 0.6 g of this dispersion was collected into a 0.5-$cm^3$ vial, the vial was closed with a cap, and then, the dispersion was irradiated with microwaves of 2,450 MHz at 170° C. for 30 minutes using a microwave synthesizer (Initiator+manufactured by Biotage Japan Ltd.). After that, the dispersion was washed with acetone, followed by filtration and then heat drying in an oven, and an exfoliated layered substance A1 derived from natural graphite was thus obtained. The exfoliated layered substance A1 had an average thickness of 123 nm and an average area of 11.6 $\mu m^2$.

Production Example 2

Similar operations to those of Production Example 1 were performed, except that natural graphite was replaced with boron nitride (manufactured by Aldrich), and an exfoliated layered substance A2 derived from boron nitride was thus obtained. The exfoliated layered substance A2 had an average thickness of 183 nm and an average area of 10.3 $\mu m^2$.

Coating Substances

The following were used as coating substances.

B1: Bisphenol A type epoxy resin (a compound represented by the general formula (1), where n is 0, product name: ADEKA RESIN EP4100E, manufactured by ADEKA Corporation)

B2: Polyvinylpyrrolidone (product name: Polyvinylpyrrolidone K30, manufactured by Tokyo Chemical Industry Co., Ltd.)

EXAMPLES AND COMPARATIVE EXAMPLES

Composite materials were produced using exfoliated layered substance slurries shown in Table 1 below. Note that, in Table 1, numbers in parentheses represent mass ratios, and MEK in the solvent section is an abbreviation for methyl ethyl ketone.

TABLE 1

| | Exfoliated layered substance | Coating substance | Solvent |
|---|---|---|---|
| Slurry 1 | A1 (70) | B1 (30) | MEK (1400) |
| Slurry 2 | A1 (70) | B2 (30) | Water (1400) |
| Slurry 3 | A2 (70) | B1 (30) | MEK (1400) |

Example 1: High-Speed Rotary Shearing Type Stirring Machine

A high-speed rotary shearing type stirring machine (model: LZB14-HM-1, manufactured by Chuorika Co., Ltd.) was used. The slurry 1 was treated at a rotation rate of 8,000 rpm for 30 minutes and then heat-and-vacuum dried to obtain a composite material of Example 1.

Example 2: Stirred Media Mill

A bead mill (model: UAM-015, manufactured by Kotobuki Industries Co., Ltd.) was used as the stirred media mill. The slurry 1 was passed through the mill five times and then heat-and-vacuum dried to obtain a composite material of Example 2. Note that, zirconia beads having a diameter of 0.1 mm were used as the dispersing medium in an amount twice the amount of the slurry 1.

Example 3: Container-Driven Mill

A planetary mill (model: V-mini300, manufactured by EME Corporation) was used as the container-driven mill. The slurry 1 was treated for 30 minutes by the planetary mill, and then was heat-and-vacuum dried to obtain a composite material of Example 3. Note that alumina beads having a diameter of 5 mm were used as the dispersing medium in an amount equal to the amount of the slurry 1.

Example 4: Colloid Mill

A colloid mill (model: Supermasscolloider MKCA6-2, manufactured by Masuko Sangyo Co., Ltd.) was used. The slurry 1 was passed through the mill five times and then heat-and-vacuum dried to obtain a composite material of Example 4. Note that the disks of the colloid mill used had a diameter of 150 mm, and the rotation rate of the rotating disk was 2,000 rpm.

Example 5: High-Pressure Emulsifying Machine

A high-pressure emulsifying machine (model: YS Nanomizer, manufactured by Yoshida Kikai Co., Ltd.) was used. The slurry 1 was passed through a flow-through type generator with pores of 107 µm three times under a pressure of 2 MPa and then heat-and-vacuum dried to obtain a composite material of Example 5.

Example 6: Ultrasonic Emulsifying Machine

An ultrasonic emulsifying machine (model: UD-201, manufactured by Tomy Seiko Co., Ltd.) was used. 200 g of the slurry 1 was irradiated with ultrasonic waves with a frequency of 20 kHz for 20 minutes and then heat-and-vacuum dried to obtain a composite material of Example 6.

Example 7: High-Speed Rotary Shearing Type Stirring Machine

Similar operations to those of Example 1 were performed, except that the slurry 2 was used. Thus, a composite material of Example 7 was obtained.

Example 8: Stirred Media Mill

Similar operations to those of Example 2 were performed, except that the slurry 2 was used. Thus, a composite material of Example 8 was obtained.

Example 9: Container-Driven Mill

Similar operations to those of Example 3 were performed, except that the slurry 2 was used. Thus, a composite material of Example 9 was obtained.

Example 10: Colloid Mill

Similar operations to those of Example 4 were performed, except that the slurry 2 was used. Thus, a composite material of Example 10 was obtained.

Example 11: High-Pressure Emulsifying Machine

Similar operations to those of Example 5 were performed, except that the slurry 2 was used. Thus, a composite material of Example 11 was obtained.

Example 12: Ultrasonic Emulsifying Machine

Similar operations to those of Example 6 were performed, except that the slurry 2 was used. Thus, a composite material of Example 12 was obtained.

Example 13: High-Speed Rotary Shearing Type Stirring Machine

Similar operations to those of Example 1 were performed, except that the slurry 3 was used. Thus, a composite material of Example 13 was obtained.

Example 14: Stirred Media Mill

Similar operations to those of Example 2 were performed, except that the slurry 3 was used. Thus, a composite material of Example 14 was obtained.

Example 15: Container-Driven Mill

Similar operations to those of Example 3 were performed, except that the slurry 3 was used. Thus, a composite material of Example 15 was obtained.

Example 16: Colloid Mill

Similar operations to those of Example 4 were performed, except that the slurry 3 was used. Thus, a composite material of Example 16 was obtained.

Example 17: High-Pressure Emulsifying Machine

Similar operations to those of Example 5 were performed, except that the slurry 3 was used. Thus, a composite material of Example 17 was obtained.

Example 18: Ultrasonic Emulsifying Machine

Similar operations to those of Example 6 were performed, except that the slurry 3 was used. Thus, a composite material of Example 18 was obtained.

Comparative Example 1

The slurry 1 was stirred for 30 minutes using a stirring bar and then heat-and-vacuum dried to obtain a composite material of Comparative Example 1.

Comparative Example 2

Similar operations to those of Comparative Example 1 were performed, except that the slurry 2 was used. Thus, a composite material of Comparative Example 2 was obtained.

Comparative Example 3

The slurry 2 was stirred for 30 minutes using a stirring bar and then spray-dried under conditions at an inlet temperature of 180° C. and an outlet temperature of 75° C. to obtain a composite material of Comparative Example 3.

Comparative Example 4

Similar operations to those of Comparative Example 1 were performed, except that the slurry 3 was used. Thus, a composite material of Comparative Example 4 was obtained.

Evaluation 1 of Resins 100 parts of polypropylene (homopolymer, melt flow rate: 8 g/10 min) and 2 parts of the composite material or the exfoliated layered substance shown in Table 2 were kneaded at 230° C. using a twin-screw kneader and extruded to prepare a resin strand having a thickness of 4 mm.

Evaluation of Dispersibility

A test piece was cut using a microtome. A center portion of the cross section was imaged using a scanning electron microscope, and the number of particles per area of 300 μm×300 μm and the percentage of aggregates were measured using a piece of image analysis software. Note that the percentage of aggregates was the percentage (%) of the total area of aggregates with respect to the total area of particles, where particles having an area of 40 μm$^2$ or greater were regarded as aggregates. The greater the number of particles, the better the dispersibility. The greater the percentage of aggregates, the higher the proportion of aggregates. Table 2 shows the results.

TABLE 2

| | Composite material or exfoliated layered substance | Number of particles | Percentage of aggregates (%) |
|---|---|---|---|
| Test piece 1 | Example 1 | 788 | 1.3 |
| Test piece 2 | Example 2 | 801 | 0.0 |
| Test piece 3 | Example 3 | 782 | 0.6 |
| Test piece 4 | Example 4 | 784 | 1.0 |
| Test piece 5 | Example 5 | 793 | 0.0 |
| Test piece 6 | Example 6 | 769 | 0.8 |
| Test piece 7 | Example 7 | 638 | 7.8 |
| Test piece 8 | Example 8 | 677 | 5.6 |
| Test piece 9 | Example 9 | 781 | 6.0 |
| Test piece 10 | Example 10 | 780 | 8.2 |
| Test piece 11 | Example 11 | 665 | 5.2 |
| Test piece 12 | Example 12 | 632 | 7.1 |
| Test piece 13 | Comparative Example 1 | 578 | 16.3 |
| Test piece 14 | Comparative Example 2 | 501 | 20.8 |
| Test piece 15 | Comparative Example 3 | 492 | 19.4 |
| Test piece 16 | A1 | 486 | 24.7 |

It can be seen from Table 2 that the test pieces 1 to 12, which were prepared using the composite materials obtained in Examples 1 to 12, had better dispersibility compared with the test pieces 13 to 15, which were prepared using the composite materials obtained in Comparative Examples 1 to 3, even though the same coating substance was used. It can be seen from these results that, with the production method of the present invention, a composite material having excellent dispersibility can be obtained.

Evaluation 2 of Resins 20 parts by mass of the composite material or the exfoliated layered substance shown in Table 3, 100 parts by mass of a bisphenol A type epoxy resin (product name: ADEKA RESIN EP4100E, manufactured by ADEKA Corporation), and 0.5 parts by mass of an imidazole catalyst (1-benzyl-2-methylimidazole) were mixed using a planetary stirring and defoaming apparatus. The mixture was heated at a temperature of 160° C. and a pressure of 5 MPa for one hour and then cured by hot pressing, and a sheet with a thickness of 3 mm was thus prepared. This sheet was cut into a square with sides of 50 mm long and used as a test piece.

Evaluation of Dispersibility

A test piece was cut using a microtome. A center portion of the cross section was imaged using a microscope, and the number of particles per area of 300 μm×300 μm and the percentage of aggregates were measured using a piece of image analysis software. Note that the percentage of aggregates was the percentage (%) of the total area of aggregates with respect to the total area of particles, where particles having an area of 50 μm$^2$ or greater were regarded as aggregates. The greater the number of particles, the better the dispersibility. The greater the percentage of aggregates, the higher the proportion of aggregates. Table 3 shows the results.

TABLE 3

| | Composite material or exfoliated layered substance | Number of particles | Percentage of aggregates (%) |
|---|---|---|---|
| Test piece 17 | Example 13 | 1996 | 1.0 |
| Test piece 18 | Example 14 | 2029 | 0.4 |
| Test piece 19 | Example 15 | 1980 | 0.7 |
| Test piece 20 | Example 16 | 1985 | 0.8 |
| Test piece 21 | Example 17 | 2008 | 0.3 |
| Test piece 22 | Example 18 | 1947 | 0.9 |
| Test piece 23 | A2 | 1544 | 7.9 |
| Test piece 24 | Comparative Example 4 | 1638 | 4.4 |

It can be seen that the test pieces 17 to 22, which were prepared using the composite materials of Examples 13 to 18 produced according to the production method of the present invention, had a lower percentage of aggregates, and hence better dispersibility of the exfoliated layered substance, compared with the test piece 23, which was prepared using the exfoliated layered substance A2, and the test piece 24, which was prepared using the composite material of Comparative Example 4. It can be seen from these results that, with the production method of the present invention, a composite material having excellent dispersibility can be obtained.

The invention claimed is:

1. A method for producing a composite material comprising an exfoliated layered substance and a coating substance coating a surface of the exfoliated layered substance, the method comprising:
   disintegrating secondary particles of an exfoliated layered substance in a solution containing a coating substance,
   wherein the exfoliated layered substance is derived from natural graphite,
   wherein the coating substance is glycidyl ether of bisphenol or a polyvinyl compound, and
   wherein the disintegration of the secondary particles of the exfoliated layered substance is performed using a dispersion machine selected from the group consisting of a high-speed rotary shearing type stirring machine, a stirred media mill, a container-driven mill, a colloid mill, a high-pressure emulsifying machine, and an ultrasonic emulsifying machine.

2. The method for producing a composite material according to claim 1,
   wherein the disintegration of the secondary particles of the exfoliated layered substance is performed using a high-speed rotary shearing type stirring machine.

3. The method for producing a composite material according to claim 2, wherein the composite material contains the coating substance in an amount of 0.1 to 100 parts by mass, with respect to 100 parts by mass of the exfoliated layered substance.

4. The method for producing a composite material according to claim 1,
wherein the disintegration of the secondary particles of the exfoliated layered substance is performed using a stirred media mill.

5. The method for producing a composite material according to claim 1,
wherein the disintegration of the secondary particles of the exfoliated layered substance is performed using a container-driven mill.

6. The method for producing a composite material according to claim 1,
wherein the disintegration of the secondary particles of the exfoliated layered substance is performed using a colloid mill.

7. The method for producing a composite material according to claim 1,
wherein the disintegration of the secondary particles of the exfoliated layered substance is performed using a high-pressure emulsifying machine.

8. The method for producing a composite material according to claim 1,
wherein the disintegration of the secondary particles of the exfoliated layered substance is performed using an ultrasonic emulsifying machine.

9. The method for producing a composite material according to claim 1,
wherein the composite material contains the coating substance in an amount of 0.1 to 100 parts by mass, with respect to 100 parts by mass of the exfoliated layered substance.

10. A method for producing a composite material comprising an exfoliated layered substance and a coating substance coating a surface of the exfoliated layered substance, the method comprising:
disintegrating secondary particles of an exfoliated layered substance in a solvent; and
dissolving a coating substance in a dispersion containing the exfoliated layered substance that has been disintegrated,
wherein the exfoliated layered substance is derived from natural graphite,
wherein the coating substance is glycidyl ether of bisphenol or a polyvinyl compound, and
wherein the disintegration of the secondary particles of the exfoliated layered substance is performed using a dispersion machine selected from the group consisting of a high-speed rotary shearing type stirring machine, a stirred media mill, a container-driven mill, a colloid a high-pressure emulsifying machine, and an ultrasonic emulsifying machine.

11. The method for producing a composite material according to claim 10,
wherein the composite material contains the coating substance in an amount of 0.1 to 100 parts by mass, with respect to 100 parts by mass of the exfoliated layered substance.

12. A method for producing a composite material comprising an exfoliated layered substance and a coating substance coating a surface of the exfoliated layered substance, the method comprising:
disintegrating secondary particles of an exfoliated layered substance in a solution containing a coating substance,
wherein the exfoliated layered substance is derived from natural graphite,
wherein the coating substance is glycidyl ether of bisphenol or a polyvinyl compound, and
wherein the exfoliated layered substance has an average thickness of 1,200 nm or less, and the exfoliated layered substance has an average area of 0.1 to 500 $\mu m^2$.

13. A method for producing a composite material comprising an exfoliated layered substance and a coating substance coating a surface of the exfoliated layered substance, the method comprising:
disintegrating secondary particles of an exfoliated layered substance in a solvent; and
dissolving a coating substance in a dispersion containing the exfoliated layered substance that has been disintegrated,
wherein the exfoliated layered substance is derived from natural graphite,
wherein the coating substance is glycidyl ether of bisphenol or a polyvinyl compound, and
wherein the exfoliated layered substance has an average thickness of 1,200 nm or less, and the exfoliated layered substance has an average area of 0.1 to 500 $\mu m^2$.

* * * * *